(12) United States Patent
Lindner et al.

(10) Patent No.: US 8,702,054 B2
(45) Date of Patent: Apr. 22, 2014

(54) FASTENING ELEMENT

(75) Inventors: Falk Lindner, Hemsbach (DE); Jens Deerberg, Essen (DE)

(73) Assignee: Carl Freudenberg KG, Weinheim (DE)

( * ) Notice: Subject to any disclaimer, the term of this patent is extended or adjusted under 35 U.S.C. 154(b) by 853 days.

(21) Appl. No.: 12/526,613

(22) PCT Filed: Feb. 6, 2008

(86) PCT No.: PCT/EP2008/000898
§ 371 (c)(1),
(2), (4) Date: Nov. 2, 2009

(87) PCT Pub. No.: WO2008/095684
PCT Pub. Date: Aug. 14, 2008

(65) Prior Publication Data
US 2010/0102193 A1    Apr. 29, 2010

(30) Foreign Application Priority Data
Feb. 8, 2007  (DE) .......................... 10 2007 007 033

(51) Int. Cl.
*A01K 97/10* (2006.01)

(52) U.S. Cl.
USPC ................... 248/534; 248/206.1; 248/229.15; 248/229.25; 248/230.6; 248/231.71

(58) Field of Classification Search
USPC .............. 248/534, 274.1, 682, 689, 692, 535, 248/304, 309.1, 316.2, 200, 205.1, 205.5, 248/206.1, 220.21, 220.22, 225.21, 229.21, 248/228.2, 230.2, 231.31, 213.2, 229.15, 248/229.25, 228.6, 230.6, 231.71; 280/47.34, 79.3, 638
See application file for complete search history.

(56) References Cited

U.S. PATENT DOCUMENTS

| | | | |
|---|---|---|---|
| 3,894,748 A * | 7/1975 | Ratcliff ......................... 280/641 |
| 4,743,040 A | 5/1988 | Breveglieri et al. |
| 5,957,352 A | 9/1999 | Gares |
| 6,260,865 B1 * | 7/2001 | Yacobi et al. .............. 280/47.34 |
| 6,502,794 B1 * | 1/2003 | Ting ............................ 248/206.2 |
| 7,240,910 B2 * | 7/2007 | Stuemke ...................... 280/79.5 |
| 2003/0178383 A1 | 9/2003 | Craft et al. |
| 2004/0251227 A1 | 12/2004 | Perkins et al. |
| 2008/0185940 A1 | 8/2008 | Lindner et al. |
| 2009/0026732 A1 | 1/2009 | Lindner et al. |

FOREIGN PATENT DOCUMENTS

| | | |
|---|---|---|
| DE | 7213268 | 7/1972 |
| DE | 8437026.2 | 4/1985 |
| DE | 8619303.1 | 12/1986 |
| DE | 91 05 003 U1 | 8/1991 |
| DE | 203 03 477 U1 | 4/2004 |
| DE | 10 2005 004134 B3 | 6/2006 |
| DE | 10 2005 044983 B3 | 1/2007 |
| DE | 10 2005 044984 B3 | 1/2007 |
| EP | 0 816 202 A1 | 1/1998 |
| EP | 100 03 138 C1 | 5/2001 |
| FR | 10049697 | 12/1953 |

* cited by examiner

*Primary Examiner* — Todd M Epps
(74) *Attorney, Agent, or Firm* — Leydig, Voit & Mayer

(57) ABSTRACT

Fastening element (1) for fastening cleaning implements (2) to a cleaning cart (3) with unequal height/width ratios of non-rotationally symmetric supporting tubes (4) comprising a holding section (5) for fastening the fastening element (1) and also at least one first and one second receptacle element (6, 7), wherein these receptacle elements are constructed so that cleaning implements (2) can be attached in at least two different planes.

14 Claims, 7 Drawing Sheets

FASTENING ELEMENT

FIELD OF THE TECHNOLOGY

The present invention relates to a fastening element for fastening cleaning implements to a cleaning cart with support tubes with unequal height/width ratios.

STATE OF THE ART

For transporting cleaning implements, such as wiping tools, brooms, buckets, and trash bags, cleaning carts are usually used in the professional cleaning business. These carts should have the most flexible configuration possible, in order to be able to equip the cleaning cart to the requirements of different cleaning implements. For this purpose, the cleaning cart features a simplest possible basic frame made from tubes to which cleaning tools could be fastened with fastening elements. These fastening elements should be able to be fastened as flexibly as possible into different positions and in different orientations. Here, the fastening elements must be constructed so that they do not present the risk of injury, for example, due to projecting, sharp-edged parts.

PRESENTATION OF THE INVENTION

The invention is based on the problem of disclosing a fastening element for a cleaning cart, where this fastening element can be fastened flexibly to a cleaning cart and allows the fastening of cleaning implements in different orientations. This problem is solved by the features of Claim 1. The subordinate claims refer to advantageous configurations.

To solve the problem, a fastening element for fastening cleaning implements to a cleaning cart is proposed with supporting tubes with unequal height/width ratios, wherein this fastening element has a holding section for fastening the fastening element and also at least one first and one second receptacle element that are constructed so that cleaning implements can be attached in at least two different, preferably orthogonal planes. The supporting tubes of the cleaning cart are usually equipped so that the receptacle elements can point in different directions. It is conceivable, for example, that the supporting tubes have a flat-oval construction and thus are higher than they are wide. These flat-oval supporting tubes could be arranged selectively upright or lying down in horizontal sections. In addition, the cleaning implements must also be able to be oriented differently according to their structure. The receptacle element whose fastening planes are orthogonal to each other produces two possibilities for orienting the cleaning implements. The receptacle elements are essentially integrated with the fastening element, so that there are no projecting parts. The fastening element is preferably produced in one piece and from the same material using an injection-molding process and is made from a plastic, for example, polyamide.

The first receptacle element can be constructed so that cleaning implements can be attached in two different, preferably orthogonal planes. Therefore, three different possibilities overall are produced for orienting the cleaning implements, thereby providing particularly great flexibility of the fastening of the cleaning implements.

The first receptacle element could have a frustum-like shape with an undercut, preferably, a conical frustum-like shape or pyramidal frustum-like shape, wherein the smaller end face is turned toward the holding section. This implementation produces a peripheral undercut and a dovetail joint on two opposing sides. In this way, congruently formed objects, for example, a mop holder, could be fastened in two orientations perpendicular to each other. This embodiment has no projecting parts. For a conical frustum-like holding section, the cleaning implement may be fastened so that it can rotate. For a pyramidal frustum-like holding section, the cleaning implement could be fastened so that it cannot rotate. Other profiles are also conceivable through which an undercut is formed through which the cleaning implements are fastened. Conceivable are, for example, L-profiles and T-profiles.

The second receptacle element could be formed by a wall that is oriented perpendicular to the smaller end face, wherein the wall, viewed in cross section, has a trapezoidal shape at least in some sections. The trapezoidal implementation similarly produces a dovetail profile, wherein this dovetail profile is perpendicular to the two other dovetail profiles formed by the pyramidal frustum. This profile is similarly characterized in that it has no projecting parts. Here, other profiles with undercuts are also conceivable, for example, L or T contours. It is also conceivable to shape the profiles of the first receptacle element and the second receptacle element differently in their shape or dimensions, so that each receptacle element could be assigned, for example, to a certain cleaning implement.

The holding section could be constructed as a snap-in hook. A snap-in hook is a fastening means that can be fastened easily and securely and that can be detached easily. The snap-in hook is here constructed so that the fastening element cannot automatically detach in the direction of the main load. In another implementation it is also conceivable that the holding section has a multi-part structure or has sections that can pivot, where the parts are connected to each other by screw connections or by a combined film hinge/snap-in hook, since those elements are arranged on the supporting tube.

The holding section may have an opening, the wall, and also two arc-shaped sections adjacent to the wall. Here, an arc-shaped section comprises a larger circular arc, so that automatic detachment of the fastening element under loading is not possible, that is, when cleaning implements are fastened to one of the receptacle elements.

The faces of the wall and also those of the sections turned toward each other could be equipped to reinforce the friction-fit connection of the holding section and/or to supplement it by a positive fit. For this purpose, these faces could be coated with a high-friction material, in particular, rubber or silicone. The coating prevents an undesired lateral displacement of the fastening element. In another implementation, a raised section that could engage in a groove of the supporting tube of the cleaning car, so that a positive-fit connection is produced, can be arranged on at least one of the faces turned toward each other.

The larger end face of the first receptacle element and/or the wall may have a catch element on the side facing away from the opening. The catch element also secures the cleaning implements fastened to one of the receptacle elements and prevents an automatic detachment.

The catch element may be formed by a raised section. The raised section may be constructed as a spherical segment and may be formed in one piece and from the same material on the fastening element. In the corresponding fastening sections of the cleaning implements, congruent recesses could be installed in which the raised section engages. In another implementation, the raised section could be formed by a spring-loaded ball, for example, a ball made from metal. Such implementations are particularly comfortable to operate and offer high operating safety.

In addition, the invention comprises a mop holder for receiving a handle or a mop-head plate of a cleaning tool that has a fastening section, in order to be fastened to the first or to the second receptacle element. The fastening section of the mop holder is constructed congruent to the receptacle sections. The unit consisting of the mop holder and fastening element allows a flexible, robust, and simple fastening of the mop holder to a cleaning cart.

BRIEF DESCRIPTION OF THE DRAWINGS

A few embodiment examples of the fastening element according to the invention will be explained in greater detail below with reference to the figures. These show, each schematically.

EMBODIMENT OF THE INVENTION

Figure 1:
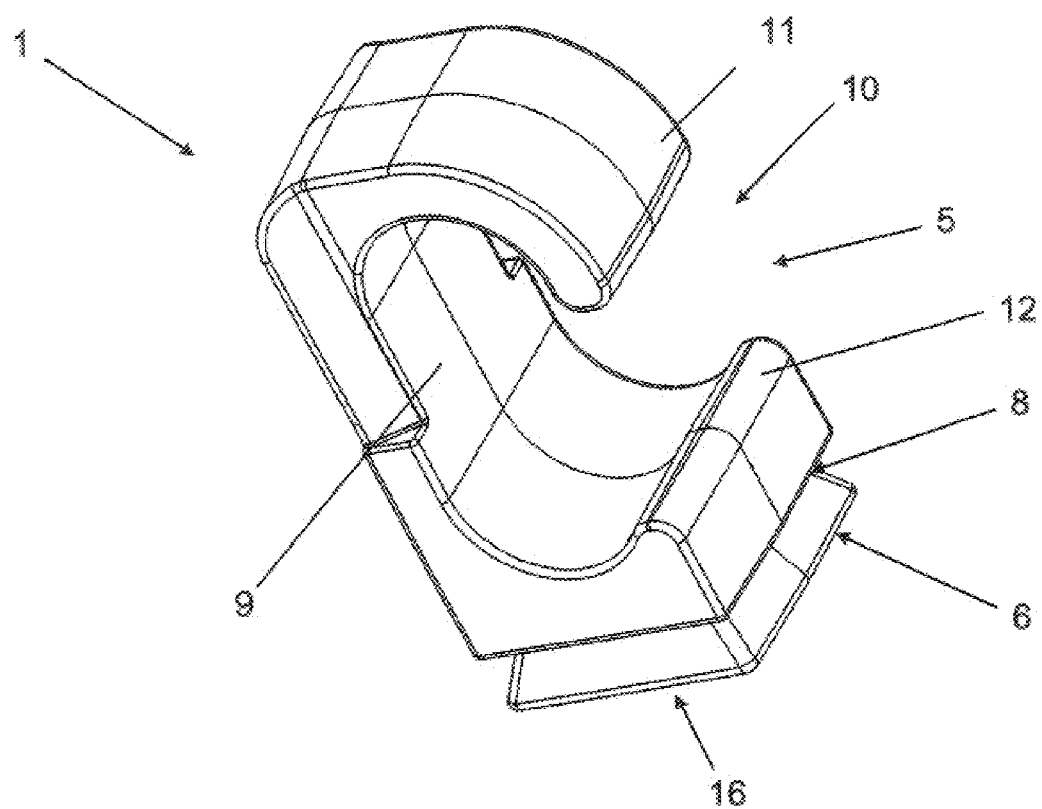
FIG. 1 is a perpective view of an illustrative embodiment of a fastening element according to the present invention.

FIG. 1 shows a fastening element 1 for fastening cleaning implements 2 to a cleaning cart 3 with non-rotationally symmetric supporting tubes 4. The fastening element is constructed in one piece and from the same material and consists of an injection-molded plastic, here polyamide. For fastening to the supporting tubes 4, it has a holding section 5 formed as a snap-in hook. In addition, the fastening element 1 has first and second receptacle elements 6, 7. The first receptacle element 6 has a pyramidal frustum-like shape, wherein the smaller end face 8 of the pyramidal frustum is turned toward the holding section 5. In this way, a dovetail joint is produced on each of two opposing sides, so that cleaning implements 2 can be attached in two orthogonal planes. The second receptacle element 7 is formed by a wall 9 that is oriented perpendicular to the smaller end face 8 of the first receptacle element 6. The wall 9 has a trapezoidal structure in some sections, wherein another dovetail profile is produced. This configuration produces a possibility for receiving cleaning implements 2 in another plane and thus in all three spatial directions. The receptacle elements 6, 7 have identical profiles, so that the cleaning implements 2 can be selectively fastened to both receptacle elements 6, 7. The holding section 5 is formed by an opening 10, the wall 9, and also two arc-shaped sections 11, 12 adjacent to the wall, where the section 11 facing away from the first receptacle element 6 comprises a larger circular arc than the other section 12.

Figure 2:
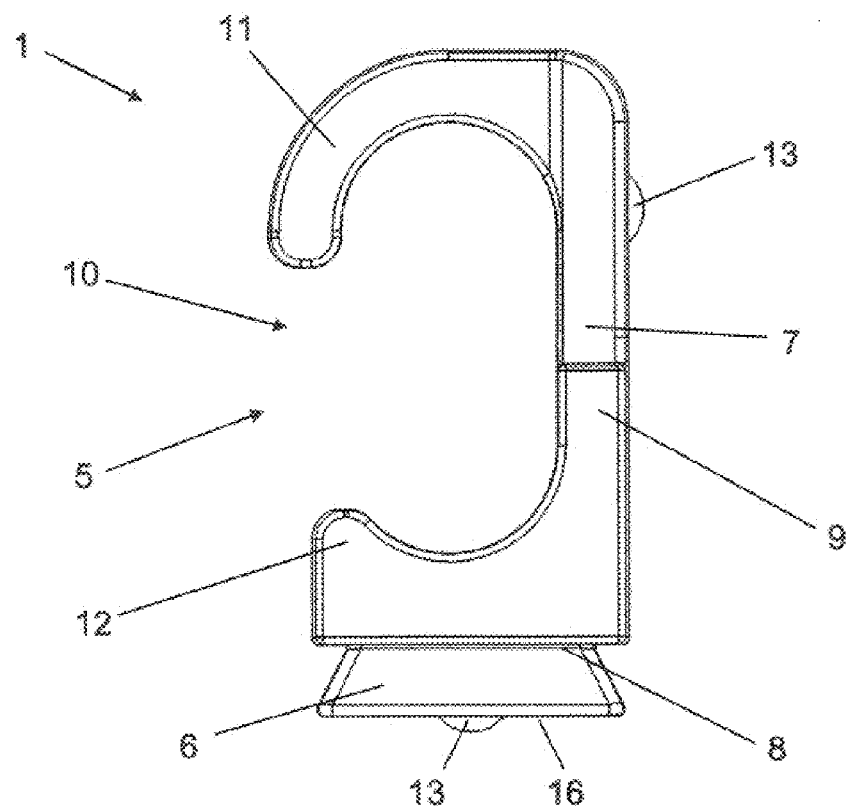
FIG. 2 is a side view of the fastening element of FIG. 1.

FIG. 2 shows a fastening element 1 according to FIG. 1, wherein, in this embodiment, the faces of the wall 9 and also the sections 11, 12 turned toward each other are coated with a high-friction material, here, rubber. In addition, both the larger end face 16 of the first receptacle element 6 and the wall 9 on the side facing away from the opening have a catch element 13 in the form of a raised section that has been molded on integrally.

Figure 3:
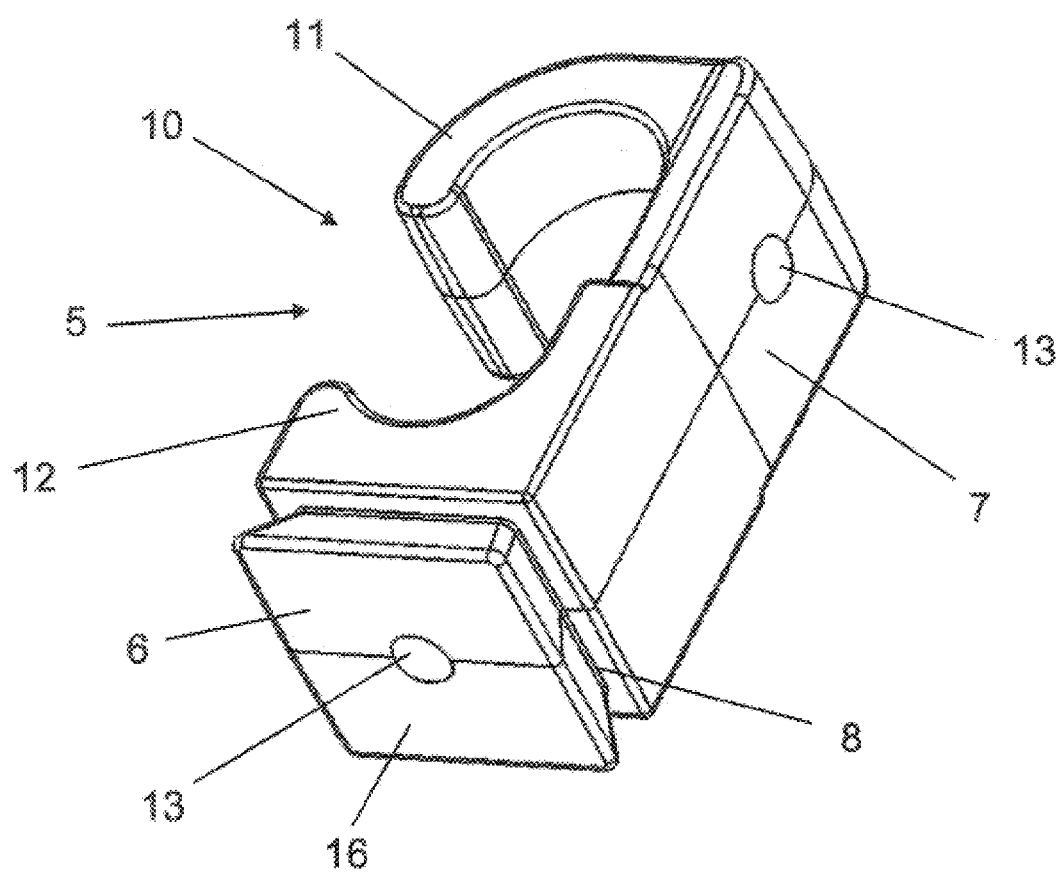
FIG. 3 is another perspective view of the fastening element of FIG. 1.

FIG. 3 shows a fastening element according to FIG. 1, wherein both the larger end face 16 of the first receptacle element 6 and the wall 9 on the side facing away from the opening have a catch element 13 in the form of a raised section that has been molded on integrally.

Figure 4:
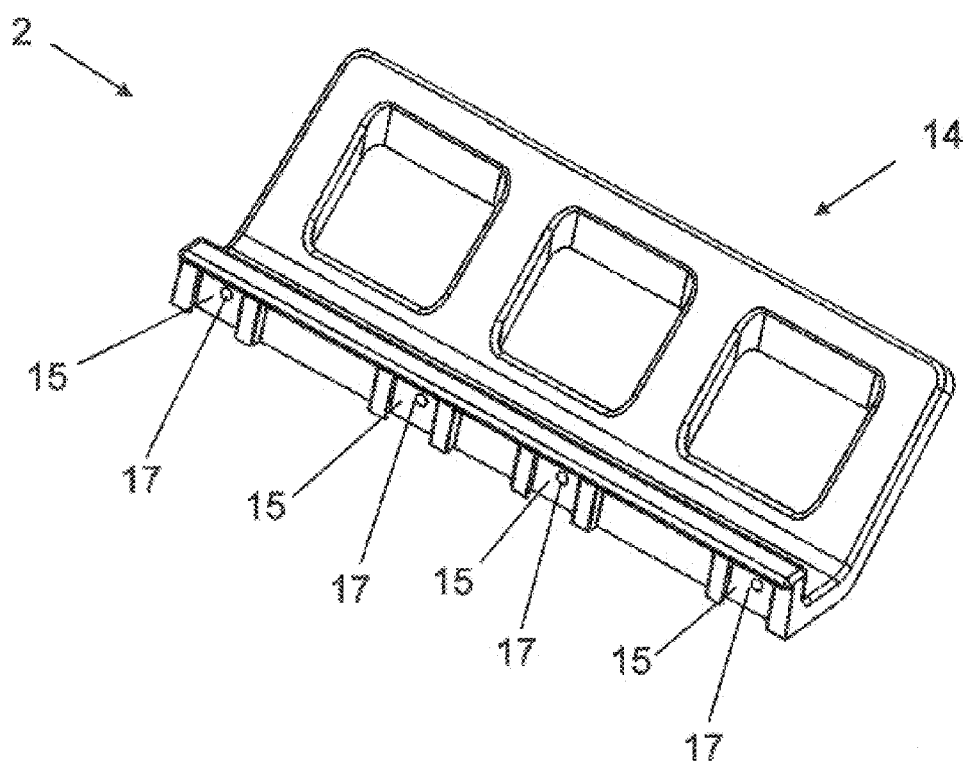
FIG. 4 is a perspective view of an illustrative mop holder according to an aspect of the invention suitable for receiving a mop head plate.

FIG. 4 shows a cleaning implement 2 in the form of a mop holder 14. The mop holder 14 is suitable for receiving a mop-head plate of a cleaning tool. The mop holder 14 has four fastening sections 15 that can be connected to the first or to the second receptacle element 6, 7 of a fastening element 1 according to FIG. 1. Each of the fastening sections 15 has a recess 17 in which the catch element 13 can engage.

Figure 5:
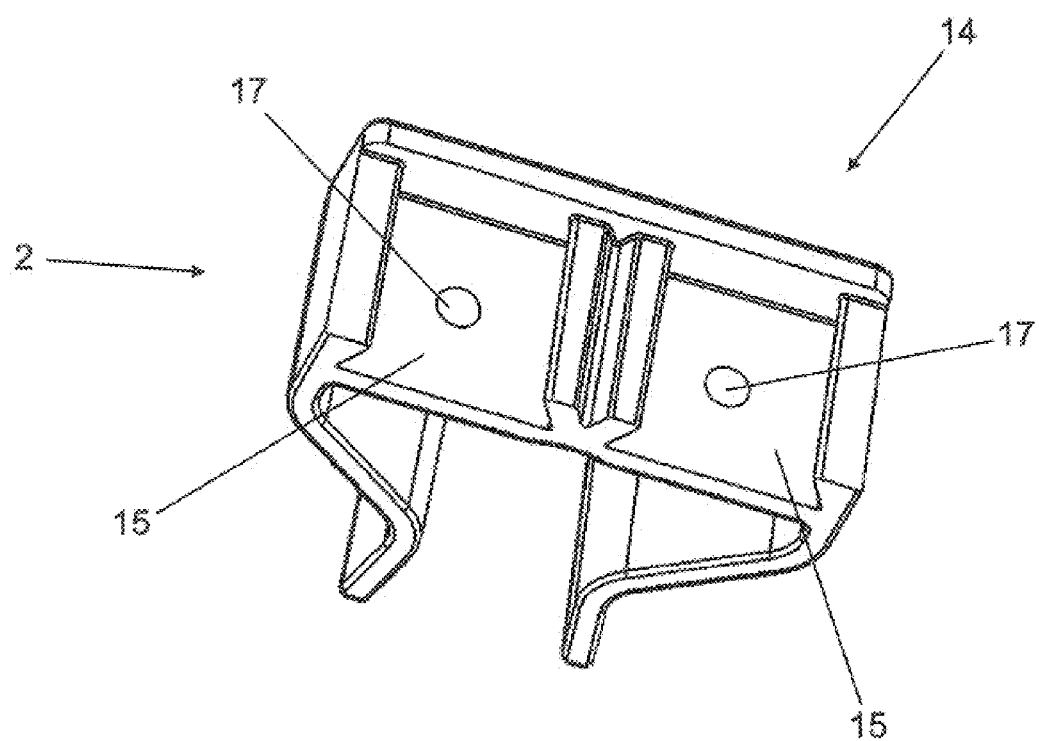
FIG. 5 is a perspective view of an illustrative mop holder according to an aspect of the invention suitable for receiving a handle.

FIG. 5 shows a cleaning implement 2 in the form of another mop holder 14. The mop holder 14 is suitable for receiving a handle of a cleaning tool. The mop holder 14 has two fastening sections 15 that can be connected to the first or to the second receptacle element 6, 7 of a fastening element 1 according to FIG. 1. Each of the fastening sections 15 has a recess 17 in which the catch element 13 can engage.

Figure 6:
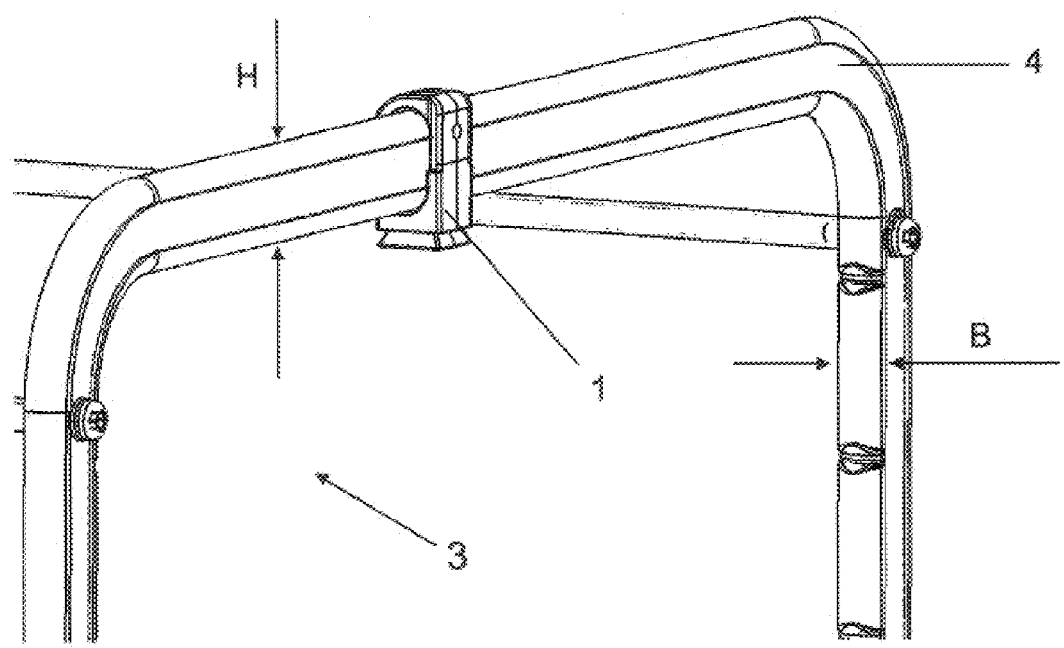
FIG. 6 is a perspective view of a portion of an exemplary cleaning cart with a fastening element according to the invention.

FIG. 6 shows a cutout of a cleaning cart 3 with a support structure made from metallic supporting tubes 4 with an unequal height/width ratio H, B. In this implementation, the supporting tubes 4 have a flat-oval construction. A fastening element 1 is clipped onto the supporting tube 4, wherein cleaning implements 2 can be placed, in turn, on this fastening element.

Figure 7:
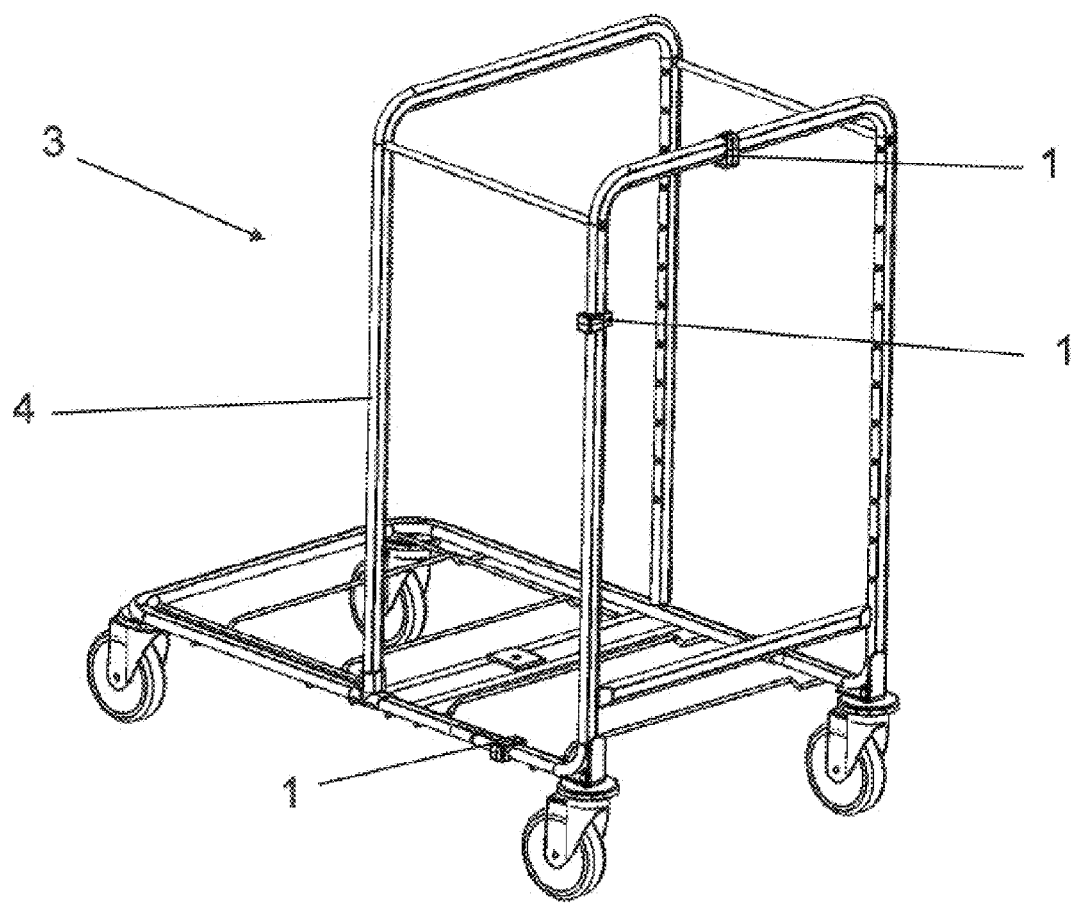
FIG. 7 is a perspective view of the cleaning cart of FIG. 6 with a supporting construction made from supporting tubes.

FIG. 7 shows a cleaning cart 3 with a support construction made from supporting tubes 4 according to FIG. 6. The supporting tubes 4 are arranged so that they are lying down in the lower section and are upright in the upper section. The fastening element 1 that is clipped onto the supporting tube 4 in the upper section is oriented so that a cleaning implement 2 can be placed on the second receptacle element 7. The fastening elements 1 that are clipped to vertical supporting tubes 4 and to supporting tubes 4 in the lower section of the cleaning cart 3 are oriented so that a cleaning implement can be placed on the first receptacle element 6. Here, cleaning implements 2 can be placed on the first receptacle element 6 in two planes that are perpendicular to each other. In all of the cases, it is ensured that no sharp-edged objects project outward.

The invention claimed is:

1. A single-piece fastening element for fastening cleaning implements to a cleaning cart, the cleaning cart having supporting tubes with unequal height/width ratios, the single-piece fastening element comprising:
a holding section for fastening the fastening element and at least first and second receptacle-elements, the holding section having a generally C-shaped element surrounding an elliptically-shaped opening and adapted for clamping the single-piece fastening element around a supporting tube section of the cleaning cart such that, when the holding section is engaged around the supporting tube section, loading of at least one of the first and second receptacle-elements avoids detachment of the single-piece fastening element from the cleaning cart;
wherein each of the first and second receptacle-elements is adapted to releasably engage a corresponding fastening section connected to a corresponding cleaning implement such that the corresponding cleaning implement is releasably connected to the cleaning cart;
wherein the first and second receptacle elements are oriented so that cleaning implements are attachable in at least two different planes,
wherein the fastening element has a single piece construction that is made of a single material, and wherein the first receptacle has a frustum structure with undercuts with a smaller end face of the first receptacle element being turned toward the holding section.

2. The fastening element according to claim 1, wherein the two different planes in which the cleaning implements are attachable are two orthogonal planes.

3. The fastening element according to claim 1 wherein the first receptacle element is configured so that cleaning implements are attachable in two different planes.

4. The fastening element according to claim 1, wherein the first receptacle element is configured so that cleaning implements are attachable in two orthogonal planes.

5. The fastening element according to claim 1, wherein the second receptacle element is formed by a wall that is oriented perpendicular to the smaller end face of the first receptacle element, at least some sections of the wall, viewed in cross section, having a trapezoidal structure.

6. The fastening element according to claim 1, wherein the holding section is constructed as a snap-in hook.

7. The fastening element according to claim 6, wherein the holding section has an opening and a wall, and two arc-shaped sections adjacent to the wall.

8. The fastening element according to claim 7 wherein the wall has faces and the arc-shaped sections are turned toward each other, the faces and arc-shaped sections being configured to reinforce a friction-fit connection of the holding section or supplement the friction-fit connection by a positive-fit connection.

9. The fastening element according to claim 8, wherein the faces of the wall and the arc-shaped sections are coated with a high-friction material.

10. The fastening element according to claim 1, wherein the first receptacle element has a larger end face with a catch element.

11. The fastening element according to claim 10, wherein the catch element is formed by a raised section.

12. The fastening element according to claim 1, wherein the corresponding cleaning element is one of a mop holder for receiving a handle or a mop-head plate of a cleaning tool that forms the corresponding fastening section.

13. The fastening element according to claim 1, wherein holding section has a wall and an opening, with the wall having a catch element on the side turned away from the opening.

14. The fastening element according to claim 13, wherein the catch element is formed by a raised section.

* * * * *